(12) United States Patent
Chen et al.

(10) Patent No.: US 9,786,041 B2
(45) Date of Patent: Oct. 10, 2017

(54) CT SYSTEMS AND METHODS THEREOF

(71) Applicants: Tsinghua University, Beijing (CN);
Nuctech Company Limited, Beijing (CN)

(72) Inventors: Zhiqiang Chen, Beijing (CN); Li Zhang, Beijing (CN); Ji Zhao, Beijing (CN); Qingping Huang, Beijing (CN); Xin Jin, Beijing (CN)

(73) Assignees: TSINGHUA UNIVERSITY, Beijing (CN); NUCTECH COMPANY LIMITED, Beijing (CN)

( * ) Notice: Subject to any disclaimer, the term of this patent is extended or adjusted under 35 U.S.C. 154(b) by 159 days.

(21) Appl. No.: 14/576,705

(22) Filed: Dec. 19, 2014

(65) Prior Publication Data
US 2015/0199804 A1    Jul. 16, 2015

(30) Foreign Application Priority Data
Dec. 26, 2013   (CN) .......................... 2013 1 0739139

(51) Int. Cl.
*G06K 9/00*      (2006.01)
*G06T 7/00*      (2017.01)
*G01V 5/00*      (2006.01)

(52) U.S. Cl.
CPC ............ *G06T 7/0002* (2013.01); *G01V 5/005* (2013.01); *G06T 2207/30112* (2013.01)

(58) Field of Classification Search
None
See application file for complete search history.

(56) References Cited

U.S. PATENT DOCUMENTS 7,233,644 B1    6/2007  Bendahan et al.
2009/0003514 A1*  1/2009  Edic .................. G01V 5/005
                                                           378/10

FOREIGN PATENT DOCUMENTS

CN          201130157 Y      10/2008
CN          101821647 A       9/2010
(Continued)

OTHER PUBLICATIONS

European Search Report, dated Apr. 24 2015. In corresponding application No. 14199278.4.
(Continued)

*Primary Examiner* — Vikkram Bali
(74) *Attorney, Agent, or Firm* — Browdy and Neimark, PLLC

(57) ABSTRACT

A CT system and method thereof are discloses. The system includes: a fixed multi-plane multi-source X-ray generation device and a control system thereof that provide X-ray source used in luggage inspection; a single-energy, pseudo-dual-energy or spectral detector system and data transfer system that receive perspective data of X ray penetrating the luggage, and transfer the data to a computer for processing; a conveyor and a control system thereof that control a speed for moving the luggage forth and back, and perform tomogram scanning; and a host computer system that performs tomogram reconstruction and provides man-machine interaction. The system takes full advantage of characteristics, such as high speed and stability, brought by the distributed ray sources which replace the normal slip ring technology. The system also adopts the idea of inverse-geometry CT, and reduces detector area and cost by increasing the number of ray sources. With the reduction of detector area, cone-beam artifacts and cup-shape artifacts caused by scattering are also
(Continued)

reduced, and influence of the oblique effect on registration of dual-energy data is suppressed.

10 Claims, 2 Drawing Sheets

(56) References Cited

FOREIGN PATENT DOCUMENTS

| | | |
|---|---|---|
| CN | 103033525 A | 4/2013 |
| WO | 2004090576 A2 | 10/2004 |
| WO | 2013078344 A2 | 5/2013 |

OTHER PUBLICATIONS

Chinese Office Action for corresponding Chinese Application CN201310739139.3 dated Dec. 8, 2016.

* cited by examiner

CT SYSTEMS AND METHODS THEREOF

CROSS-REFERENCE TO RELATED APPLICATIONS

This application claims priority to the Chinese Patent Application No. 201310739139.3 filed on Dec. 26, 2013, the entire content of which is incorporated herein by reference in its entirety.

TECHNICAL FIELD

Embodiments of the present disclosure relate to radiography and security inspection technology, and more particularly, to multi-source static Computed Tomography (CT) system and method for security inspection of luggage and articles.

BACKGROUND

CT technology has been playing an important role in occasions such as security inspection, thanks to its capability of eliminating influence from object overlapping. Conventional CT apparatuses use a slip ring device, and acquire projection data at different angles by rotating X-ray source and detectors. Then, the CT apparatuses reconstruct a tomogram image to obtain information of the inside of the inspected luggage or articles. In combination with dual-energy or multi-energy imaging technology, the existing inspection apparatuses can reconstruct atomic number and electron density of the inspected object, and identify materials contained in article, achieving good effects in detecting explosives or drugs, for example.

The existing CT technology for security inspection has disadvantages. First, there is a problem with the scanning speed. A high speed is helpful to mitigation of pressure caused by a large number of passengers and cargoes. However, a high-speed scanning typically requires a slip ring that can rotate at a high speed. Due to difficulties in fabrication precision and reliability, for example, the high-speed slip ring is very expensive in manufacture and maintenance, and thus is difficult in popularization. Second, there exist problems such as false alarm and missing alarm. It is difficult for the automatic identification and alarm functions in the CT technology to achieve an accuracy of 100%, and thus detection of contraband still requires manual auxiliary examination, and sometimes it even requires opening a luggage case for examination. Such examination often takes several or tens of minutes, which increases labor and time cost and limits improvement in examination efficiency. In order to address these problems, an apparatus using secondary scanning technology has been introduced into market, which can reduce a frequency of opening the luggage case by performing a high-accuracy secondary scanning on any suspicious luggage case to improve CT image quality. This secondary scanning, however, also results in increased scanning time and interruption in the security inspection process.

In recent years, the technology of carbon-nanotube X-ray tube has been introduced to practical applications. Unlike normal X-ray sources, the carbon-nanotube X-ray tube does not require high temperature for generating rays. Instead, it generates cathode rays based on principle of discharging of carbon-nanotube tip, and uses the cathode rays to strike a target to generate X rays. Such X-ray source has advantages of rapid switch-on/off, and a smaller volume. A "static CT" apparatus without rotation can be formed by arranging the X-ray source properly and irradiating X rays onto the object from different directions. This significantly accelerates the radiography process while omitting the slip-ring structure and saving cost, thereby contributing a lot to the field of security inspection.

SUMMARY

In view of one or more problems with the conventional technology, embodiments of the present disclosure provide a CT system and method.

According to some embodiments of the disclosure, a CT system is provided comprising: a conveyor mechanism configured to convey and move an object under inspection linearly; a first scanning stage comprising multiple sections of ray sources, multiple sections of detectors, and a first data acquisition device, and configured to scan the object and generate a first digital signal, wherein each section of ray sources comprises a plurality of source points, and the multiple sections of ray sources and the multiple sections of detectors are arranged in an inverse-geometry CT manner; a second scanning stage configured to be spaced from the first scanning stage at a preset distance in a direction of the object's movement, and comprising multiple sections of ray sources, multiple sections of detectors, and a second data acquisition device, wherein each section of ray sources comprises a plurality of source points, and the multiple sections of ray sources and the multiple sections of detectors are arranged in an inverse-geometry CT manner; a control device configured to control an order in which the source points in the first and second scanning stages emit beams, so that the first scanning stage generates the first digital signal, and the second scanning stage outputs a second digital signal; and a processing device configured to reconstruct a CT image of the object based on the first and second digital signals.

In an embodiment, the CT system further comprises a third scanning stage that comprises multiple sections of ray sources, multiple sections of detectors, and a third data acquisition device, wherein the multiple sections of ray sources and the multiple sections of detectors are arranged in an inverse-geometry CT manner, the control device is further configured to control an order in which the source points in the third scanning stage emit beams, so that the third scanning stage outputs a third digital signal, and the processing device is further configured to reconstruct a CT image of the object at least based on the first, second and third digital signals.

In an embodiment, the multiple ray sources in the first, second and third scanning stages are provided in a plurality of scanning planes perpendicular to the direction of the object's movement, and in each of the scanning planes the source points are distributed along one or more continuous or discontinuous segments of line or arc.

In an embodiment, the processing device is configured to analyze the object based on the first digital signal, and the source points of the second scanning stage are preset to use a higher voltage to increase ray energy when the analysis result of the processing device indicates that a higher penetrability is required to discern a metal object and its neighborhood.

In an embodiment, the processing device is configured to analyze the object based on the first digital signal, and the source points of the second scanning stage are preset to use a larger number of ray sources to increase a spatial resolution when the analysis result of the processing device indicates that it is required to discern more tiny objects.

In an embodiment, the processing device is configured to analyze the object based on the first digital signal, and the source points of the second scanning stage are adjusted to have a preset number of activated ray sources when the analysis result of the processing device indicates that it is required to complete scanning within a prescribed time period.

In an embodiment, the processing device is configured to analyze the object based on the first digital signal, and a beam spectrum for the source points of the second scanning stage is adjusted when the analysis result of the processing device indicates that a more accurate material identification is required.

In an embodiment, a beam intensity of the source points of each of the first, second and third scanning stages can be adjusted according to a number of ray sources preset in the plane where the source points are provided.

In an embodiment, when the number of the source points is large, the beam intensity is increased to reduce beam-emitting time of each source point and thus ensure completion of scanning within a prescribed time period; when the number of the source points is small, a high beam intensity is used to increase a signal-to-noise ratio of scan data.

According to another aspect of the present disclosure, a method for a CT system comprising a first scanning stage, and a second scanning stage spaced from the first scanning stage at a preset distance in a moving direction of an object under inspection, wherein each of the scanning stages is provided in an inverse-geometry CT manner, the method comprises: controlling the first scanning stage to scan the object during the movement of the object, and generating a first digital signal; controlling the second scanning stage to scan the object during the movement of the object, and generating a second digital signal; and reconstructing a CT image of the object based on the first and second digital signals.

According to the embodiments of the present disclosure, scanning based on multi-plane is performed in a single scanning process, and thus speeds up the scanning process.

BRIEF DESCRIPTION OF THE DRAWINGS

For a better understanding of the present disclosure, embodiments of the present disclosure will be described below with reference to figures in which.

The figures do not illustrate all components or configurations in embodiments. Like reference signs refer to the same or similar elements throughout the figures.

DETAILED DESCRIPTION OF THE EMBODIMENTS

Figure 1:
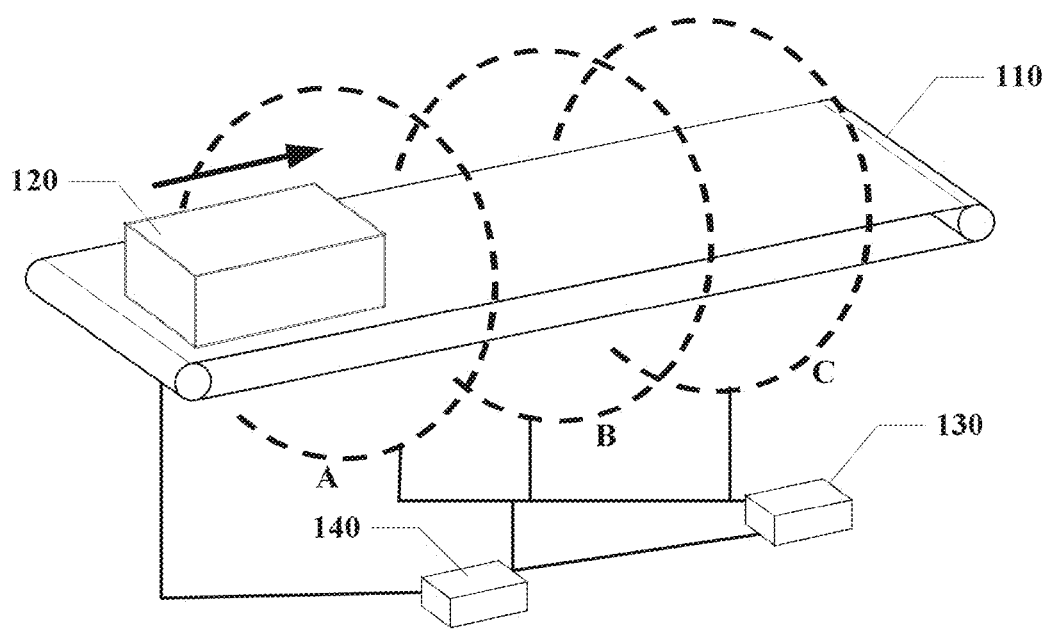
FIG. 1 illustrates a schematic block diagram of a CT system according to an embodiment of the disclosure.

The particular embodiments of the disclosure are described below in details. It shall be noted that the embodiments herein are used for illustration only, but not limiting the disclosure. In the description below, a number of particular details are explained to provide a better understanding to the disclosure. However, it is apparent to those skilled in the art that the disclosure can be implemented without these particular details. In other examples, well-known circuits, materials or methods are not described so as not to obscure the disclosure.

Throughout the specification, reference to "one embodiment," "an embodiment," "one example" or "an example" means that the specific features, structures or properties described in conjunction with the embodiment or example are included in at least one embodiment of the present disclosure. Therefore, the phrases "in one embodiment," "in an embodiment," "in one example" or "in an example" occurred at various positions throughout the specification may not refer to one and the same embodiment or example. Furthermore, specific features, structures or properties may be combined into one or several embodiments or examples in any appropriate ways. Moreover, it should be understood by those skilled in the art that figures here are for the purpose of illustration, and not necessarily drawn to scale. It should be appreciated that "connecting" or "coupling" a component to another component may mean that the component is directly connected or coupled to the other component, or there may be a component intervening between them. On the contrary, "directly connecting" or "directly coupling" a component to another component mans that there is no intervening component. Like reference signs refer to similar elements throughout the figures. The term "and/or" used herein means any and all combinations of one or more listed items.

In view of the problem with the conventional technology, embodiments of the present disclosure propose a static CT system having multiple X-ray sources. The detectors and ray sources in each scanning stage are arranged in an inverse-geometry CT manner in the system. For example, a number of source points correspond to a small block of detector. When a conveyor mechanism conveys and moves linearly an object under inspection, first and second scanning stages scan the object and generate first and second digital signals, respectively. Then, a CT image of the object is reconstructed by a processing device. In an embodiment, the first scanning stage includes multiple sections of ray sources, multiple sections of detectors, and a first data acquisition device, and configured to scan the object and generate the first digital signal. Each section of ray sources includes a plurality of source points, and the multiple sections of ray sources and the multiple sections of detectors are arranged in an inverse-geometry CT manner. The second scanning stage is provided spaced from the first scanning stage at a preset distance in a direction of the object's movement, and includes multiple sections of ray sources, multiple sections of detectors, and a second data acquisition device. Each section of ray sources includes a plurality of source points, and the multiple sections of ray sources and the multiple sections of detectors are arranged in an inverse-geometry CT manner. The control device is coupled to the first and second scanning stages, and configured to control an order in which the source points in the first and second scanning stages emit beams, so that the first scanning stage generates the first digital signal, and the second scanning stage outputs a second digital signal. The processing device is configured to reconstruct a CT image of the object based on the first and second digital signals. By using distributed X-ray sources, it is possible to avoid use of a high-speed slip ring, and increase the inspection speed while reducing cost for device manufacture and maintenance. In addition to increase in speed, the scanning method based on multi-plane scanning and inverse-geometry CT do not require use of a large number of detectors, and can eliminate oblique effect and cup-shape artifacts.

FIG. 1 illustrates a schematic block diagram of a CT system according to an embodiment of the disclosure. As shown in FIG. 1, the multi-source static CT system for security inspection of luggage and articles may include multiple scanning stages (i.e., the first scanning stage A, the second scanning stage B, the third scanning stage C, . . . ), a conveyor mechanism 110, a control device 140, and a processing device 130. The respective scanning stages are provided apart from each other at a preset distance in the direction of the object's movement. Each scanning stages includes a ray source, a detector and an acquisition device. Here, the ray sources may include a plurality of distributed X-ray source points.

In the shown embodiments, the conveyor mechanism 110 conveys and moves the object 120 under inspection linearly. The first scanning stage A includes multiple sections of ray sources, multiple sections of detectors, and a first data acquisition device, and configured to scan the object and generate the first digital signal. Each section of ray sources includes a plurality of source points, and the multiple sections of ray sources and the multiple sections of detectors are arranged in an inverse-geometry CT manner. The second scanning stage B is provided spaced from the first scanning stage at a preset distance in a direction of the object's movement, and includes multiple sections of ray sources, multiple sections of detectors, and a second data acquisition device. Each section of ray sources includes a plurality of source points, and the multiple sections of ray sources and the multiple sections of detectors are arranged in an inverse-geometry CT manner.

The control device 140 is coupled to the first and second scanning stages, and configured to control an order in which the source points in the first and second scanning stages emit beams, so that the first scanning stage generates the first digital signal, and the second scanning stage outputs a second digital signal. The processing device 130 is configured to reconstruct a CT image of the object based on the first and second digital signals.

In other embodiments, the processing device 130 is coupled to the respective scanning stages and the control device 140, and configured to reconstruct a CT image of the object at a first image quality based on the first digital signal, and analyze the CT image. Then, the control device 140 adjusts a scanning parameter of the second scanning stage based on an analysis result of the processing device 130 to cause the second scanning stage to output a second digital signal. The processing device 130 reconstructs a CT image of the object at a second image quality higher than the first image quality at least based on the second digital signal (that is, based on the second digital signal, or based on the first and second digital signals).

According to some embodiments, when the second scanning stage scans a part of the object, the control device adjusts the scanning parameter of the second scanning stage based on an analysis result of the processing device corresponding to the part, to cause the second scanning stage to output the second digital signal. In an example where 100 slices (tomograms) need to be reconstructed for a target luggage case, after the first scanning stage scans the 8th slice, the processing device (e.g., computer) reconstructs and analyzes this slice, and estimates a scanning parameter for the second and subsequent scanning stages to scan this slice. When the part of the object corresponding to the $8^{th}$ slice passes through the second scanning stage, the second scanning stage adjusts the parameter based on the analysis result, and scans the object. This is, the scanning parameter is adjusted differently when different parts of the object pass through the second scanning stage.

In other embodiments, the ray sources distributed in multiple planes correspond to different angles, that is, the source points in each scanning stage are centralized and arranged in one part of the circle. For example, the first scanning stage scans the object in an angle range of −30° to 30°. In this case, a limited-angle reconstruction algorithm may be used to obtain coarse slice information and calculate scanning parameter. When the first slice of the object passes through the second scanning stage, the scanning parameter may be adjusted based on the analysis result to scan in the angle range of 30° to 90°.

The third scanning stage C includes a third ray source, a third detector, and a third data acquisition device. The control device 140 adjust a scanning parameter of the third scanning stage C based on the CT image of the first image quality (e.g., the first resolution) to cause the third scanning stage to output a third digital signal, and the processing device reconstructs a CT image of the object at a third image quality higher than the first image quality at least based on the third digital signal (that is, based on the third digital signal, or based on the third digital signal and at least one of the first and second digital signals). When the third scanning stage scans a part of the object, the control device adjusts the scanning parameter of the third scanning stage based on an analysis result of the processing device corresponding to the part, to cause the third scanning stage to output the third digital signal.

Each of the multi-point distributed X-ray source module may have, for example, one or more source points. The energy for each source point may be set, and the order in which the source points are activated may be set. In the system, the source points are distributed on multiple scanning planes (which are perpendicular to the channel travel direction). In each plane, the source points are distributed in one or more continuous or discontinuous segments of line or arc. Since the energy for each source point may be set, several scanning modes may be implemented during the beam-emitting process in which different source points may have different energy spectra, or energy for source points in different planes may be different. The source points may be divided into different groups. For example, the source points in each module or in each plane may be classified into a group. The order in which the source points in the same group cause electrons to strike a target is adjustable, and it is possible to implement sequential or alternate beam emission. Source points in different groups may be activated simultaneously to scan, and thus the scanning speed is increased.

Each of the scanning stages includes a complete set of area array X-ray detector, sense circuit, acquisition-trigger signal circuit, and data transfer circuit. The ray sources are distributed in multiple planes, and thus a corresponding detector array is provided for each plane. The detector array is arranged in a circle or an arc. The central column of detectors may be in the same plane where the ray sources are located (when the source points are provided at a part of the circle, the detectors may be placed at the remaining part of the circle), or in a plane parallel to the plane where the ray sources are located (when the source points are distributed along the circle, there is no remaining room for placing the detectors). The distance between the two planes where the ray sources and the detectors are located respectively should be kept as small as possible to alleviate the Oblique Effect due to the fact that the ray sources and the source points are not in the same plane. The detector array may have one or more rows, and the detectors may be of single-energy, dual-energy or spectral type.

The conveyor mechanism 110 includes a carrier table or a conveyance tape. The control device 140 controls the X-ray machine and a rack for the detectors. By controlling the beam-emitting mode of the distributed ray sources or the translation movement of the object or combination thereof, it is possible to implement scanning in a spiral, circular or other special trajectory.

The control device 140 is responsible for control over operations of the CT system including mechanic rotation, electrical control, and safety interlock control. The control device 140 particularly controls beam energy and sequence of the ray sources, and readout of detector data and data reconstruction.

Figure 2:
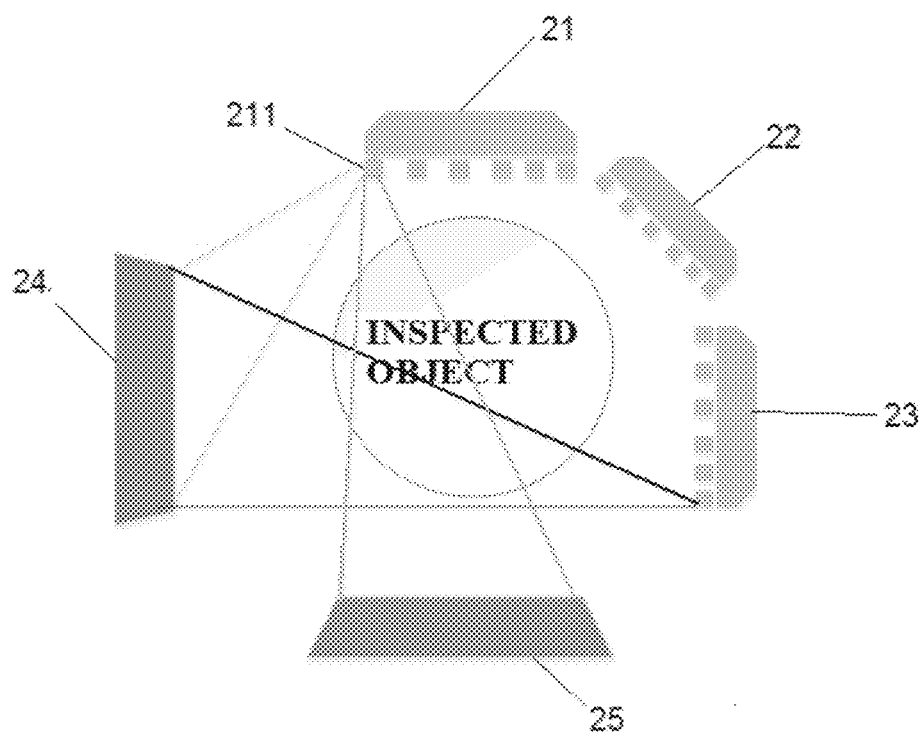
FIG. 2 illustrates a schematic diagram of configuration of the respective scanning stages in the CT system according to an embodiment of the disclosure.

FIG. 2 illustrates a schematic diagram of configuration of the respective scanning stages in the CT system according to an embodiment of the disclosure. As shown in FIG. 2, each of the scanning stages includes multiple sections of ray sources and several corresponding sections of detectors that are arranged in an inverse-geometry CT manner. Each section of ray sources includes a number of source points. In the shown embodiment, each scanning stage has multiple sections 21, 22, 23 of ray sources and several corresponding sections 24, 25 of detectors. Each section of ray sources includes a number of source points, for example, the ray source 21 includes several source points 211.

Figure 3:
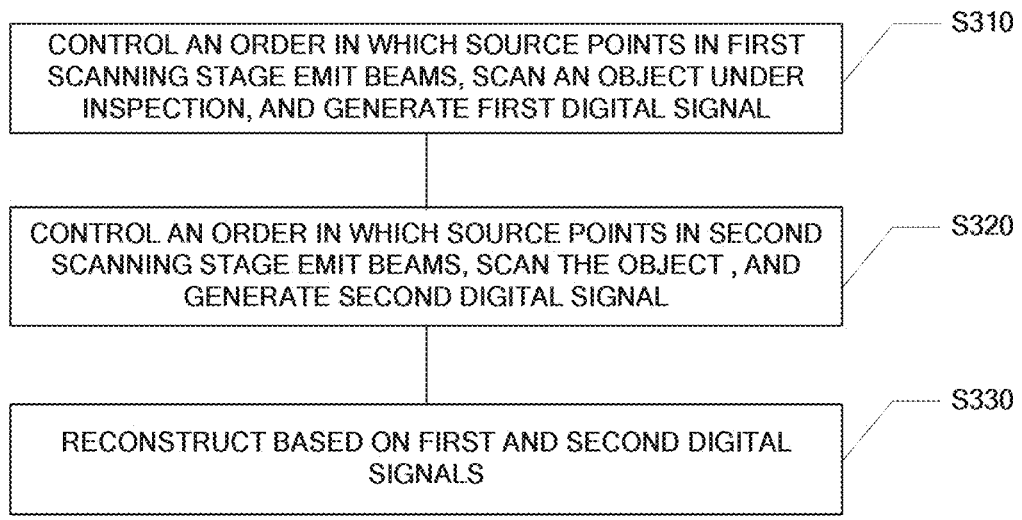
FIG. 3 illustrates a flowchart of a method for a CT system according to an embodiment of the disclosure.

FIG. 3 illustrates a flowchart of a method according to an embodiment of the disclosure. As shown in FIG. 3, a method for a CT system is illustrated. The CT system includes a first scanning stage, and a second scanning stage spaced from the first scanning stage at a preset distance in a moving direction of an object under inspection, and each of the scanning stages is provided in an inverse-geometry CT manner. In an embodiment, each scanning stage includes multiple sections of ray sources and multiple sections of detectors. Each section of ray sources includes a plurality of source points, and the multiple sections of ray sources and the multiple sections of detectors are arranged in an inverse-geometry CT manner.

As shown in FIG. 3, the first scanning stage is controlled to scan the object during the movement of the object, and generate a first digital signal at step S310.

At step S320, the second scanning stage is controlled to scan the object during the movement of the object, and generate a second digital signal.

At step S330, a CT image of the object is reconstructed based on the first and second digital signals.

In an embodiment, the control device may control the respective scanning stages to emit beams simultaneously when the beams do not interfere with each other, and thus improve imaging efficiency. In another embodiment, if some suspicious substance has been found at the initial scanning process (i.e., the scanning process by the first scanning stage), only part of the object needs to be reconstructed, and only part of the ray sources are required for obtaining sufficient data. This can reduce dose and improve imaging efficiency.

Figure 4:
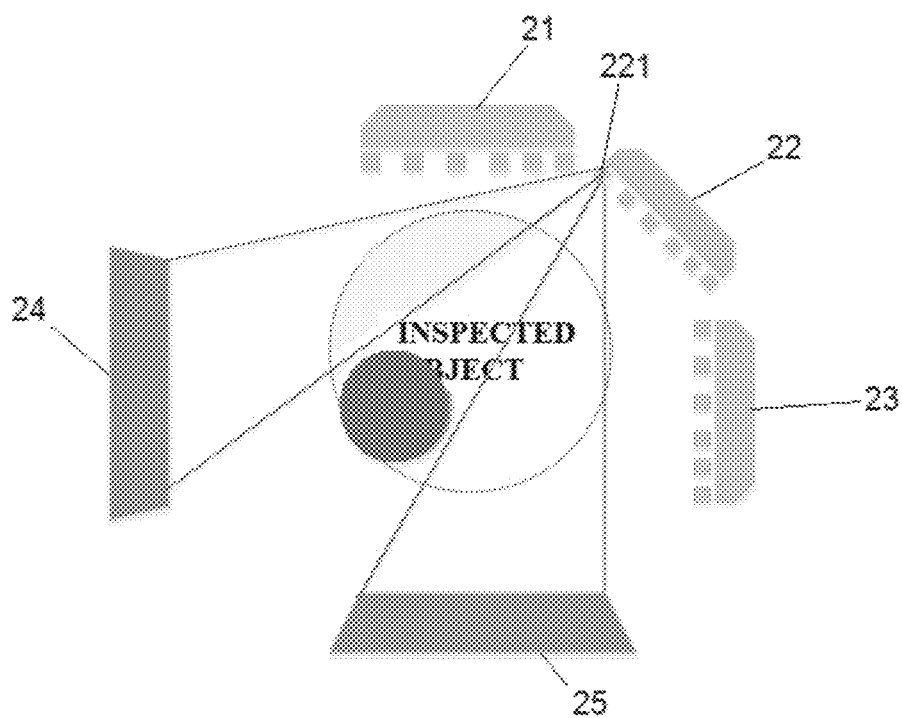
FIG. 4 is a schematic diagram illustrating the scanning mode of a scanning stage in the CT system according to an embodiment of the disclosure.

As shown in FIG. 4, when a Region Of Interest (ROI) is located on the lower left side, the ray source 221 in the figure has no contribution to reconstruction of the ROI. Therefore, scanning can be omitted, and scanning speed can be increased.

In the above embodiments, data for different ray sources are discontinuous and redundant upon reconstruction. In order to address the problem, rearrangement may be applied, that is, rearranging multiple items of cone-beam data into data of parallel rays, and then performing reconstruction. Redundant data may be normalized using a weighted averaging method.

In the above embodiments utilizing inverse-geometry CT, a rotation device in the normal CT system can be omitted, thereby reducing system cost and increasing detection accuracy. The multi-plane scanning mode further improves scanning speed. Use of distributed ray sources provides flexibility. By adjusting the energy for ray sources based on pre-processing results and incorporating multi-spectrum ray detection technology, it is possible to improve identification of dangerous and suspicious objects, such as flammable material, explosives and drugs, and to accommodate requirements of security inspection in various scenarios.

Further, in the above embodiments, detector area is reduced in multiple, and thus cost for increasing detector resolution is reduced in multiple. The resolution can be greatly increased. With the reduction of detector area, cone-beam artifacts and cup-shape artifacts caused by scattering are also reduced, and influence of the oblique effect on registration of dual-energy data is suppressed.

In other embodiments, an inspection different from the method of FIG. 3 may be used. The object is scanned by the first scanning stage during the movement of the object, and a first digital signal is generated. When the object 120 (e.g., luggage case) is imported to the system by the conveyor mechanism 110, the ray sources and detectors in the first plane A of the system scan the luggage case, and transfer the scan data to the processing device 130 for CT reconstruction. At the same time, the system records the time and location at which the scanned part of the luggage case passes through the first plane. It is possible to calculate when the scanned part will pass through the subsequent plane based on the tape speed and coding.

Then, a CT image of the object at a first image quality is reconstructed based on the first digital signal, and the CT image is analyzed.

In an example, the processing device 130 determines the overall feature of the scanned part of the luggage case according to the CT reconstruction result. The determination may be made as to whether there are many high-density materials (e.g., metals), whether there are many minutious substances (tiny articles), and whether there is any suspicious object in the luggage case.

Next, a scanning parameter of the second scanning stage is adjusted based on an analysis result of the processing device to cause the second scanning stage to output a second digital signal.

The control device 140 sets in advance the scanning parameter (e.g., ray source voltage, current, the number of ray sources to be activated) for the subsequent scanning stage based on the analysis result. For example, the source points of the subsequent scanning stage may be preset to use a higher voltage to increase ray energy when a higher penetrability is required to discern a metal object and its neighborhood. The source points of the subsequent scanning stage may be preset to use a larger number of ray sources to increase, for example, a spatial resolution when it is required to discern more tiny objects. A beam intensity of each source point may also be adjusted according to the number of activated ray sources preset in the plane where the source point is provided, so that the scanning process can be completed with a prescribed time period. For example, when the number of the source points is large, the beam intensity is increased to reduce beam-emitting time of each source point; when the number of the source points is small, a high beam intensity is used to increase a signal-to-noise ratio of scan data and improve noise level in the reconstructed image.

Then, a CT image of the object is reconstructed at a second image quality higher than the first image quality at least based on the second digital signal.

For example, when a part of the object 120 passes through the subsequent scanning plane, the control device 140 controls the scanning plane to scan the object according to the scanning parameter preset for this part, and to obtain scan data.

In some embodiments, when the second scanning stage scans a part of the object, the control device adjusts the scanning parameter of the second scanning stage based on an analysis result of the processing device corresponding to the part, to cause the second scanning stage to output the second digital signal As such, when the part of the object 120 has passed through all the scanning planes, the system integrates all the scan data, and reconstructs the object using a single-energy or spectral CT reconstruction algorithm to obtain a final 3D CT reconstruction result as well as identifies contraband and generates alarms.

In some embodiments, the distributed ray sources and the detectors are distributed on three circular rings spaced from each other. The planes A, B and C are the first, second and third scanning planes respectively, as shown in FIG. 1. The sources in each plane may be sparsely arranged, or densely arranged within a limited angle range.

In the above embodiments, a multi-source X-ray emission device is used to irradiate luggage from different angles, and thus a rotation device in the normal CT system can be omitted, thereby reducing system cost and increasing detection accuracy. The multi-plane scanning mode further improves scanning speed. Use of distributed ray sources provides flexibility. By adjusting the energy for ray sources based on pre-processing results and incorporating multi-spectrum ray detection technology, it is possible to improve identification of dangerous and suspicious objects, such as flammable material, explosives and drugs, and to accommodate requirements of security inspection in various scenarios.

The embodiments take full advantage of distributed ray sources, and develop a new control method. Distributing the ray sources over multiple scanning planes makes it possible to adjust spectrum, beam intensity and number of the ray sources according to the object's characteristics. When the object passes through the first plane, a pre-reconstruction result can be obtained using a sparse-view or limited-angle reconstruct method, and then the spectrum, beam intensity and number for the subsequent two planes can be changed based on the analysis result and requirements. In this way, an optimal reconstruction result can be obtained on one hand, and reconstruction results at different energy levels can also be obtain on the other hand to realize material identification.

In some embodiments, the problem of data synchronization between different planes needs to addressed when the ray sources and detectors are distributed over multiple locations. By triggering the X-ray sources to emit beams in a tape-coding method, it is possible to ensure that detectors in different planes acquire data of the same plane of the object. Alternatively, time differences between time points when the object passes through several planes of detectors may be determined according to the fixed locations of the several planes, and thus corresponding data may be extracted.

In some embodiments where data at different energy levels and different angles are to be combined for reconstruction, data at all the angles may be first reconstructed using the normal single-energy CT reconstruction algorithm. The reconstruction result maintains an accurate geometric structure. Then, by using the geometric structure as a priori knowledge, scan data may be grouped and reconstructed on a group basis according to the beam energy of the source points, to obtain a reconstruction result of different X-ray energy levels.

The foregoing detailed description has set forth various embodiments of CT system and method by use of block diagrams, flowcharts, and/or examples. Insofar as such block diagrams, flowcharts, and/or examples contain one or more functions and/or operations, it will be understood by those skilled in the art that each function and/or operation within such examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of those skilled in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

While the present disclosure has been described with reference to several typical embodiments, it is apparent to those skilled in the art that the terms are used for illustration and explanation purpose and not for limitation. The present disclosure may be practiced in various forms without departing from the esprit or essence of the disclosure. It should be understood that the embodiments are not limited to any of the foregoing details, and shall be interpreted broadly within the esprit and scope as defined by the following claims. Therefore, modifications and alternatives falling within the scope of the claims and equivalents thereof are to be encompassed by the scope of the present disclosure which is defined by the claims as attached.

What is claimed is:

1. A Computed Tomography (CT) system, comprising:
  a conveyor configured to convey and move an object under inspection linearly;

a first scanning stage comprising multiple sections of ray sources, multiple sections of detectors, and a first data acquisition device, and configured to scan the object and generate a first digital signal, wherein each section of ray sources comprises a plurality of source points, and the multiple sections of ray sources and the multiple sections of detectors are arranged in an inverse-geometry CT manner;

a second scanning stage configured to be spaced from the first scanning stage at a preset distance in a direction of the object's movement, and comprising multiple sections of ray sources, multiple sections of detectors, and a second data acquisition device, wherein each section of ray sources comprises a plurality of source points, and the multiple sections of ray sources and the multiple sections of detectors are arranged in an inverse-geometry CT manner;

a processor configured and operable to reconstruct a CT image of the object at a first image quality based on the first digital signal, and analyze the CT image; and a controller configured and operable to control an order in which the source points in the first and second scanning stages emit beams, and adjust a scanning parameter of the second scanning stage based on an analysis result of the processor to cause the second scanning stage to output a second digital signal;

wherein the processor reconstructs a CT image of the object at a second image quality higher than the first image quality at least based on the first and second digital signals.

2. The CT system according to claim 1, further comprising a third scanning stage that comprises multiple sections of ray sources, multiple sections of detectors, and a third data acquisition device, wherein the multiple sections of ray sources and the multiple sections of detectors are arranged in an inverse-geometry CT manner, the controller is further configured and operable to control an order in which the source points in the third scanning stage emit beams, so that the third scanning stage outputs a third digital signal, and the processing device is further configured to reconstruct a CT image of the object at least based on the first, second and third digital signals.

3. The CT system according to claim 2, wherein the multiple ray sources in the first, second and third scanning stages are provided in a plurality of scanning planes perpendicular to the direction of the object's movement, and in each of the scanning planes the source points are distributed along one or more continuous or discontinuous segments of line or arc.

4. The CT system according to claim 1, wherein the processor is configured and operable to analyze the object based on the first digital signal, and the source points of the second scanning stage are preset to use an increased voltage to increase ray energy when the analysis result of the processor indicates that an increased penetrability is required to discern a metal object and its neighborhood.

5. The CT system according to claim 1, wherein the processor is configured and operable to analyze the object based on the first digital signal, and the source points of the second scanning stage are preset to use an increased number of ray sources to increase a spatial resolution when the analysis result of the processor indicates that it is required to discern tiny objects.

6. The CT system according to claim 1, wherein the processor is configured and operable to analyze the object based on the first digital signal, and the source points of the second scanning stage are adjusted to have a preset number of activated ray sources when the analysis result of the processor indicates that it is required to complete scanning within a prescribed time period.

7. The CT system according to claim 1, wherein the processor is configured to analyze the object based on the first digital signal, and a beam spectrum for the source points of the second scanning stage is adjusted when the analysis result of the processor indicates that a more accurate material identification is required.

8. The CT system according to claim 2, wherein a beam intensity of the source points of each of the first, second and third scanning stages can be adjusted according to a number of ray sources preset in the plane where the source points are provided.

9. The CT system according to claim 8, wherein when the number of the source points is large, the beam intensity is increased to reduce beam-emitting time of each source point and thus ensure completion of scanning within a prescribed time period; or when the number of the source points is small, a high beam intensity is used to increase a signal-to-noise ratio of scan data.

10. A method for a Computed Tomography (CT) system comprising a first scanning stage, and a second scanning stage spaced from the first scanning stage at a preset distance in a moving direction of an object under inspection, wherein each of the scanning stages is provided in an inverse-geometry CT manner, the method comprises:

controlling the first scanning stage to scan the object during the movement of the object, and generating a first digital signal;

reconstructing a CT image of the object at a first image quality based on the first digital signal, and analyzing the CT image;

adjusting a scanning parameter of the second scanning stage based on an analysis result;

controlling the second scanning stage to scan the object during the movement of the object, and generating a second digital signal; and reconstructing a CT image of the object at a second image quality higher than the first image quality at least based on the first and second digital signals.

* * * * *